(12) United States Patent
Lee et al.

(10) Patent No.: US 6,443,018 B1
(45) Date of Patent: Sep. 3, 2002

(54) MULTIDIRECTIONAL FATIGUE DAMAGE INDICATOR

(75) Inventors: Hyeong-Yeon Lee; Jong-Bum Kim; Yoo Bong, all of Daejeon-Si (KR)

(73) Assignee: Korea Atomic Energy Research Institute, Seoul (KR)

( * ) Notice: Subject to any disclaimer, the term of this patent is extended or adjusted under 35 U.S.C. 154(b) by 0 days.

(21) Appl. No.: 09/587,295

(22) Filed: Jun. 5, 2000

(30) Foreign Application Priority Data

Mar. 31, 2000 (KR) .............................................. 00-16842

(51) Int. Cl.$^7$ ................................................. G01L 5/04
(52) U.S. Cl. ..................................... 73/862.046; 73/862
(58) Field of Search ........................... 73/862.046, 794, 73/795, 796, 797

(56) References Cited

U.S. PATENT DOCUMENTS 6,181,841 B1 * 1/2001 Hodge .......................... 385/12

* cited by examiner

Primary Examiner—Benjamin R. Fuller
Assistant Examiner—Andre Allen
(74) Attorney, Agent, or Firm—Arent Fox Kintner Plotkin & Kahn

(57) ABSTRACT

A multidirectional fatigue damage indicator is disclosed. The fatigue damage indicator is composed of a series of fatigue fuse elements welded to a semicircular assembly frames. The fuse elements have the same fatigue lifetime in each row but have different lifetime from row to row so that it may enable one to monitor the progress of fatigue damage of the structure. A series of fatigue fuse elements are welded to a semicircular assembly frame in circumferential direction and additionally in radial direction. The arrangement in circumferential direction is to cover the changing characteristics of the principal stress directions while that in radial direction is to monitor the actual progress of fatigue damage under combined cyclic loads by watching the sequential fracture of the fuse elements.

7 Claims, 2 Drawing Sheets

MULTIDIRECTIONAL FATIGUE DAMAGE INDICATOR

BACKGROUND OF THE INVENTION

1. Field of the Invention

The present invention relates, in general, to fatigue damage indicators and, more particularly, to a multidirectional fatigue damage indicator, which is capable of monitoring the actual degree of fatigue damage for a structure under complex fatigue loads.

2. Description of the Prior Art

For the purpose of monitoring the fatigue damage of a structure under complex fatigue loads, the fatigue monitoring devices such as fatigue fuse and fatigue indicator have been proposed. Those conventional devices are usually attached along the direction of the maximum principal stress after the direction is determined. Therefore, the conventional fatigue monitoring devices are actually capable of monitoring fatigue damage only in one fixed direction. However, the directions and the magnitudes of the principal stresses, in general, change during transient loading condition.

The other important characteristics of fatigue is that the actual direction of fatigue damage does not always coincide with the direction of maximum principal stresses because fatigue damage depends upon the number of occurrences as well as the magnitude of the stresses. For example, consider the two transient states, one with large magnitude of stress and small number of occurrences, and the other with the smaller magnitude but the larger number of occurrences. In this case, the actual fatigue damage can occur along the direction of the smaller principal stress if the number of occurrence is sufficiently larger. Therefore, it is not reasonable to monitor the fatigue damage in one pre-determined direction because this may underestimate the actual damage.

In brief, the conventional fatigue monitoring devices can not predict reasonably the actual progress and the location of fatigue damage because the monitoring is limited to only one direction. In addition, they usually require burdensome estimation of the principal stress direction before attaching them to the structure.

SUMMARY OF THE INVENTION

The present fatigue damage indicator has been invented to resolve the above problems occurring in the prior art. The objective of the present invention is to provide more reliable fatigue damage indicator which is capable of monitoring the actual progress of fatigue damage in any direction and eliminating burdensome process of determining the maximum principal stress direction prior to attachment to the structure under combined fatigue loads.

In order to accomplish the above objective, the present invention provides a multidirectional fatigue damage indicator, composing of a series of fuse elements in circumferencial direction to cover the changing characteristics of the principal stresses direction. In addition, the semicircular rows of the fuse elements are arranged in radial direction to monitor the progress of the fatigue damage by watching the sequential fracture of the fuse elements in a radial direction. The fuse elements in each row have the same fatigue lifetime with the same crack lengths but the lifetimes are different from row to row with different crack lengths.

In addition, the present invention provides another shape of multidirectional fatigue damage indicator, composing of two rows of semicircular fatigue fuse elements in full circular assembly frame to monitor the degree of fatigue damage in alternative way. Another merit of the present invention is that this indicator has no limit in the number of fuse elements such as even or odd numbers and the rows of the fuse elements can be added according to the required reliability for the fatigue damage indicator.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
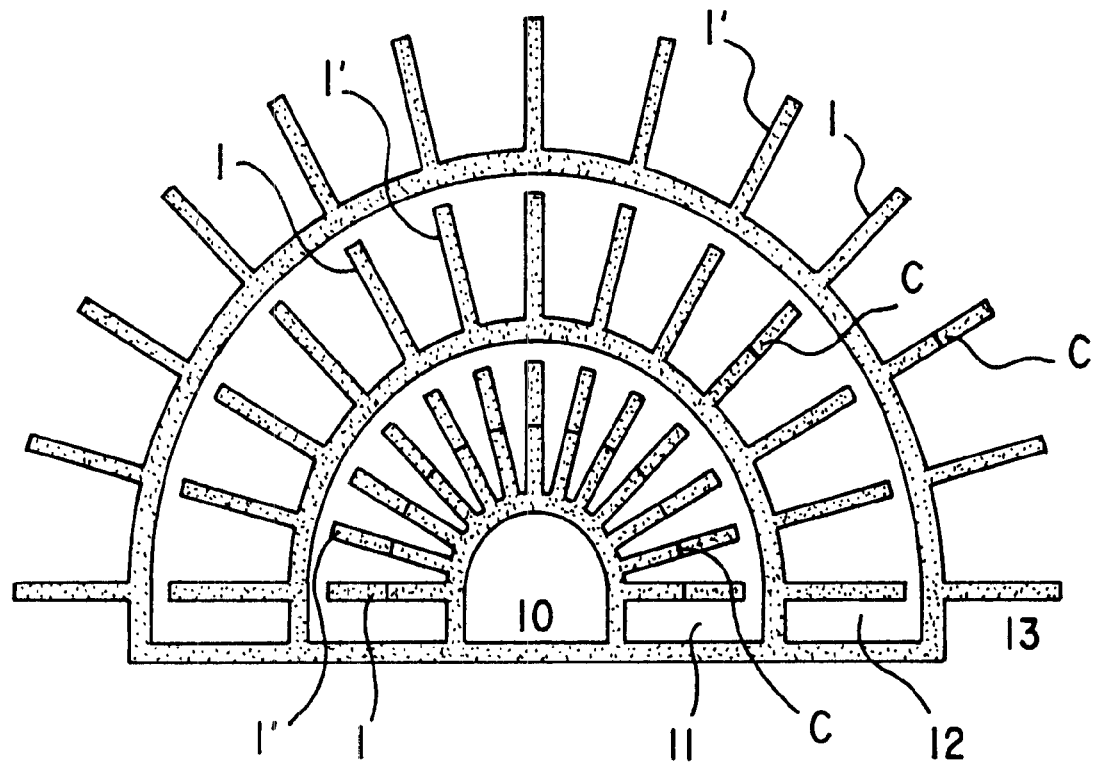
FIG. 1 is a plan view showing a multidirectional fatigue damage indicator in which three rows of fatigue fuse elements are integrated in main assembly frame. Each fuse element of a row is welded to the semicircular assembly frame.

Reference now should be made to the drawings, in which the same reference numerals are used throughout the different drawings to designate the same or similar elements.

Generally, the direction of the maximum principal stress is varied during transient state. The other important aspect of fatigue damage is that fatigue depends upon the number of occurrences as well as the magnitude of the stresses. That is, fatigue failure can occur along the non-maximum principal stress direction if the number of occurrences is sufficiently larger than that of the maximum principal stress under complex loads.

The multidirectional fatigue damage indicator is capable of monitoring the damage in almost all directions by increasing the number of the fuse elements in the circumferential direction.

When the center of weak portion is 10 in FIG. 1, a series of fuse elements 1 and 1' made of the same material as that of the structure are circumferentially welded to the semicircular assembling frames and the frames are again radially attached to the assembly frame.

The innermost fuse elements of the first row starting at 11 have deepest artificial cracks C so that these may be fractured at a target lifetime (for instance, of $0.1N_f$ where $N_f$ is the fatigue lifetime of the structural material. The mid fuse elements of the second row starting at 12 have deeper artificial cracks C so that the elements may be fractured at another target life of $N_f$ (for instance, of $0.3N_f$). The outermost fuse elements of the third row starting at 13 have the shortest artificial cracks so that it would fail at the longest lifetime (for instance, of $0.5N_f$) All fuse elements will have 20% side-groove so that mode I fracture may occur in plane strain condition.

The number of fuse elements per row in circumferential direction and the number of rows in radial direction may be adjusted according to the required accuracy in monitoring.

For instance, if higher accuracy is required, the fatigue damage indicator may have more than three rows of fuse elements in radial direction and may have more number of fuse elements in circumferential direction although the fatigue fuse elements in FIG. 1 are arranged every 15° angle. In case of 5-row indicator, the fuse elements with fatigue lifetime of $0.1N_f$, $0.2N_f$, $0.3N_f$, $0.5N_f$ and $0.7N_f$, respectively, can be used. The main assembly frame is an integrated body with the semicircular assembly frames.

Each of the fatigue fuse elements must be attached to the structure in such a way to experience the same stress and damage histories as those in the structure. In particular, the cracked portions of the fatigue fuse elements are not attached to the structure so as to minimize the bonding effect. In order to monitor the fatigue damage of the high temperature structure, the multidirectional fatigue damage indicator can be attached to the structure by using high temperature adhesives.

The multidirectional fatigue damage indicator may be connected to a remote monitoring system in order to monitor the progress of the cracks in the fatigue fuse elements by means of the electric potential drop.

The size of the multidirectional fatigue damage indicator may be adjusted depending upon the size of the structure. That is, a large-size multidirectional fatigue damage indicator may be attached to a large structure, while a precisely fabricated small-size multidirectional fatigue damage indicator may be attached to a portion of the interest where stress concentration due to the discontinuity of material or geometry occurs.

The multidirectional fatigue damage indicator can be fabricated by welding a series of fuse elements 1 or 1' to an semicircular assembly frame. The multidirectional fatigue damage indicator can be simply attached to the weak portion of the structure for the monitoring of the local fatigue damage, and it can be installed in an on-line fashion for the real time remote monitoring of the fatigue damage.

In practical applications, the multidirectional fatigue damage indicator can be attached to a weak portion such as welded joints of pressure vessel or piping structure and enables one to monitor the actual degree of fatigue damage in easy and realistic way.

Figure 2:
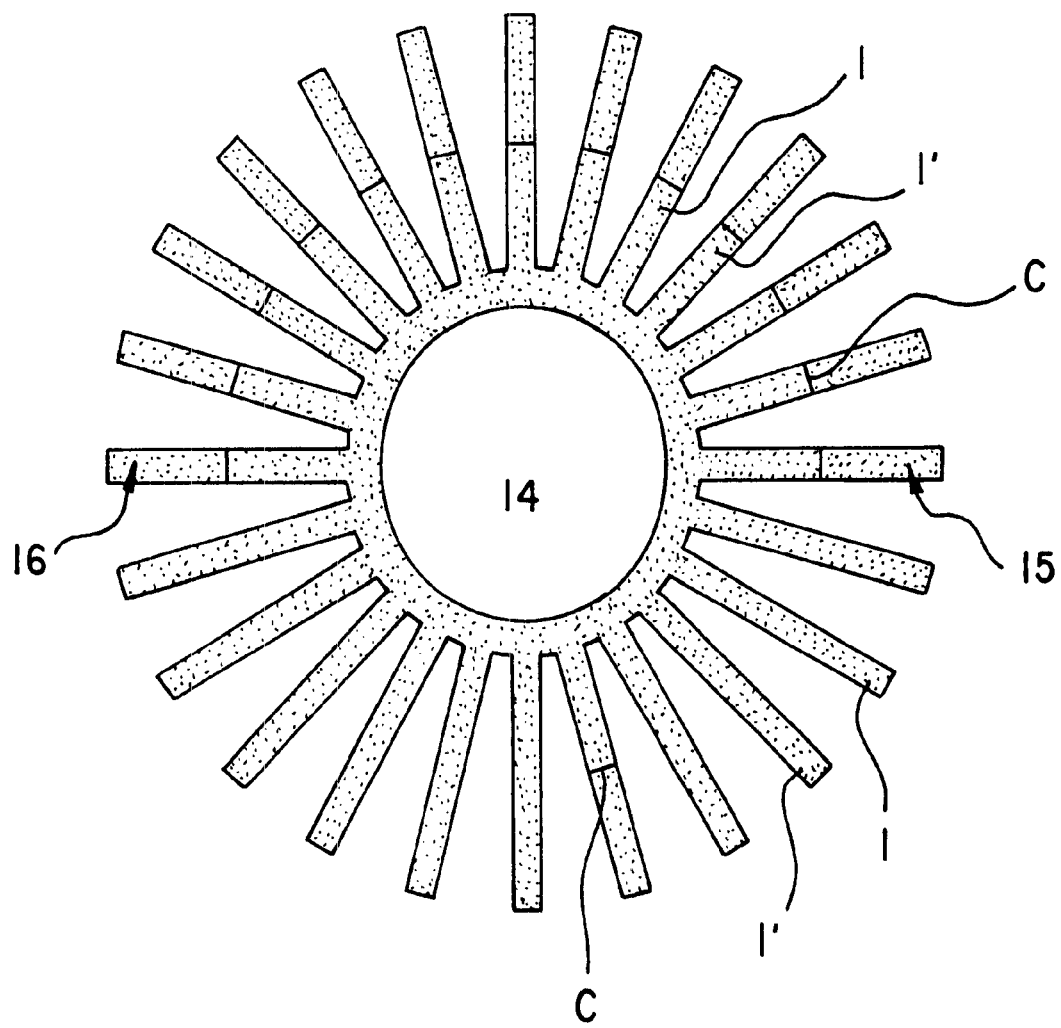
FIG. 2 is a plan view showing another type of two-row, circular multidirectional fatigue damage indicator in which the fuse elements of the first row with deep crack lengths are arranged circumferentially upward while the fuse elements of the second row with short crack lengths are arranged downward. This results in a full circular shape of damage indicator in which the fuse elements in the first row starting at 15 of FIG. 2 in anti-clockwise direction have deeper artificial cracks than those of the second row starting at 16, in accordance with another embodiment of the present invention.

FIG. 2 is a plan view showing another type of two-row multidirectional fatigue damage indicator having the same concept with the previous one in accordance with another embodiment. Assuming that the center of the weak portion of a structure is 14 in FIG. 2, a series of fuse elements 1 and 1' made of the same material as that of the structure are arranged in circumferential direction. In this fatigue indicator, the first row of fuse elements consists of upper 12 elements starting at 15 in anti-clockwise direction while the second row of the fuse elements consists of lower 12 elements starting at 16. FIG. 2 has basically the same concept with FIG. 1 but the second row with different fatigue lifetime is moved downward. The fuse elements in the first row of FIG. 2 have the shorter fatigue life (for instance 0.1 $N_f$) with the deeper cracks while the fuse elements of the second row have the longer lifetime (for instance 0.5 $N_f$) with relatively shorter crack length.

As described above, the present invention provides a multidirectional fatigue damage indicator, which is capable of monitoring the actual degree of fatigue damage more reliably than the previous inventions. In addition, the present fatigue indicator is easy to use because it eliminates the burdensome process of determining the maximum principal stress directions prior to attaching the indicator to the structure.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A multidirectional fatigue damage indicator, comprising: a series of fatigue fuse elements, said fatigue fuse elements being arranged in a half circle to cover the changing characteristics of principal stress directions under transient loads in a structure having a weak portion, each of said fatigue fuse elements being attachable to the structure in such a way to experience the same stress and damage histories as in the structure.

2. A multidirectional fatigue damage indicator, comprising: multiple semicircular rows of fatigue fuse elements around a center of the weak portion of a structure wherein fuse elements of each row have the same fatigue lifetimes but the lifetimes from row to row are different so that sequential fracture of the fuse elements in radial direction enables monitoring the progress of the fatigue damage as loads are cyclically applied.

3. The fatigue damage indicator according to claim 2 further comprising, fuse elements of a first row having the deepest artificial cracks so that said fuse elements of the first row may be fractured at a shortest fraction of the fatigue lifetime of the structure, fuse elements in a second row have deeper artificial cracks than said fuse elements of the third row so that said fuse elements in the second row are fractured at a rather long fatigue lifetime, and fuse elements of a third row have the shortest artificial cracks so that said fuse elements of the third row are fractured at the longest fatigue lifetime, wherein the artificial cracks and sidegroove along a width of the fatigue fuse elements in the first, second and third rows are formed respectively to monitor the progress of the fatigue damage along the principal stress directions.

4. The fatigue damage indicator according to claim 2, wherein a number of said fuse elements in circumferential direction and the rows in radial direction are capable of being adjusted depending upon target reliability of the indicator, and wherein the size of the indicator is capable of being adjusted according to the size of the structure.

5. The fatigue damage indicator according to claim 2, wherein said fatigue fuse elements are separately made and welded to a semicircular assembly frame so as to form an integrated monitoring device, and attached to the structure by an adhesive in such a way for the indicator to experience the same stress and damage with those of the structure.

6. The fatigue damage indicator according to claim 2 further comprising fuse elements of an upper semicircular row having deeper crack lengths while those of a lower semicircular row have shorter crack lengths so that two step sequential fractures along a direction can be monitored.

7. A multidirectional fatigue damage indicator, comprising: an assembly frame, and a series of fatigue fuse elements extending radially from said frame in at least a half circle to cover the changing characteristics of principal stress directions under transient loads in a structure having a weak portion, each of said fatigue fuse elements being made of the same material as the structure and being attachable to the structure in such a way to experience the same stress and damage histories as in the structure.

\* \* \* \* \*